United States Patent
Marchan et al.

(10) Patent No.: US 10,671,906 B1
(45) Date of Patent: Jun. 2, 2020

(54) METHOD FOR ANALYZING AND VERIFYING A MICROSCOPIC IMPRINT CONFIGURED ON AN OBJECT FOR DETERMINING AUTHENTICITY

(71) Applicant: TREDCO METALS, LLC, Miami, FL (US)

(72) Inventors: Francisco Marchan, Samborondon (EC); Alejandro Ruiz, Quito (EC)

( * ) Notice: Subject to any disclaimer, the term of this patent is extended or adjusted under 35 U.S.C. 154(b) by 0 days.

(21) Appl. No.: 16/371,447

(22) Filed: Apr. 1, 2019

(51) Int. Cl.
G06K 19/08 (2006.01)
G06K 19/06 (2006.01)
H04L 9/06 (2006.01)

(52) U.S. Cl.
CPC ..... *G06K 19/086* (2013.01); *G06K 19/06084* (2013.01); *G06K 19/06112* (2013.01); *H04L 9/0637* (2013.01)

(58) Field of Classification Search
CPC combination set(s) only.
See application file for complete search history.

(56) References Cited

U.S. PATENT DOCUMENTS

| | | | |
|---|---|---|---|
| 6,804,356 B1 * | 10/2004 | Krishnamachari | .......... H04N 1/32101 348/571 |
| 7,357,333 B2 * | 4/2008 | Gilfix | ............ G07D 7/20 235/380 |
| 8,746,555 B2 | 6/2014 | Callegari et al. | |
| 9,208,394 B2 * | 12/2015 | Di Venuto Dayer | .............. G06K 9/00577 |
| 2012/0243797 A1 | 9/2012 | Di Venuto Dayer et al. | |
| 2016/0098723 A1 * | 4/2016 | Feeney | ............ G06Q 20/4016 705/75 |

* cited by examiner

*Primary Examiner* — Kristy A Haupt
(74) *Attorney, Agent, or Firm* — Sanchelima & Associates, P.A.; Christian Sanchelima; Jesus Sanchelima

(57) ABSTRACT

The present invention is a method for analyzing an imprint configured on a surface of an object at a source location and verifying at a destination location to determine the object's authenticity. The method includes capturing at least one image at a source location and examining and analyzing the captured image. The analysis is performed by dividing the captured image into multiple layers. For each layer area, size, threshold points, distance between threshold points and angle of lines are determined and then stored in the first database. Afterwards this data is encrypted by a source user and uploaded to a blockchain. When the object reaches the destination location the destination user performs the same operation of capturing, examining and analyzing by dividing the captured image into multiple layers in the same fashion as performed by the source user and then stored in a second database. The destination user also decrypts the encrypted data of the first database and compares the data of first database with the data of the second database. The results of the comparison help to determine an object's authenticity.

6 Claims, 3 Drawing Sheets

METHOD FOR ANALYZING AND VERIFYING A MICROSCOPIC IMPRINT CONFIGURED ON AN OBJECT FOR DETERMINING AUTHENTICITY

BACKGROUND OF THE INVENTION

1. Field of the Invention

The present disclosure relates to a method for analyzing and verifying an imprint. More particularly, the present disclosure relates to a method for analyzing and verifying a microscopic imprint configured on an object to determine the authenticity of an object.

2. Description of the Related Art

In transit from source locations to destination locations, originally manufactured objects are replaced with duplicate ones and hence necessitate objects to be configured with unique imprint marks. However, when unique imprint marks are microscopic, it is difficult to examine, verify and authenticate objects. Hence, there is a need for a method for analyzing and verifying a microscopic imprint configured on an object to determine the authenticity.

Several designs for various methods for inspection of objects have been designed in the past. None of them, however, includes a method for analyzing and verifying an imprint to determine the authenticity by a source user as well as a destination user.

Applicant believes that a related reference corresponds to a U.S. Pat. No. 8,746,555 filed by SICPA HOLDING SA for a method of marking a document or item; method and device for identifying the marked document or item; use of circularly polarizing particles. The SICPA patent discloses a method for identification and authentication of an item marked with randomly distributed particles for its identification or authenticity with cholesteric liquid crystal polymer (CLCP) flakes that reflect circular polarized light. However, the use of cholesteric liquid crystal polymer (CLCP) flakes and polarized light makes the method complex.

Another related application is US patent application number 2012243797 by DI Venuto Dayer Celine, Kutter Martin for a means for using microstructure of materials as a unique identifier. The patent application '797 discloses a visual identification of materials or documents for tracking or authentication purposes by comparing object images with reference images. However, the method of comparison may not be accurate as it lacks the step of dividing the image while examination and analysis.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a method for analyzing a microscopic imprint configured on a surface of an object at a source location and verifying at a destination location to determine authenticity.

It is another object of the present invention to provide a method for analyzing and verifying a microscopic imprint configured on a surface of an object which includes dividing an image of object in multiple layers to obtain increased accuracy of examination, analyzes and verification.

It is still another object of the present invention to provide a method for analyzing and verifying a microscopic imprint configured on a surface of an object that is usable by a source user and a destination user.

It is yet another object of the present invention to provide a method for analyzing and verifying a microscopic imprint configured on a surface of an object that includes encryption of analyzing data and verifying data.

It is still another object of the present invention to provide a method for analyzing and verifying a microscopic imprint configured on a surface of an object that includes analyzing and verifying of the material of object along with analyzing and verifying microscopic imprint.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
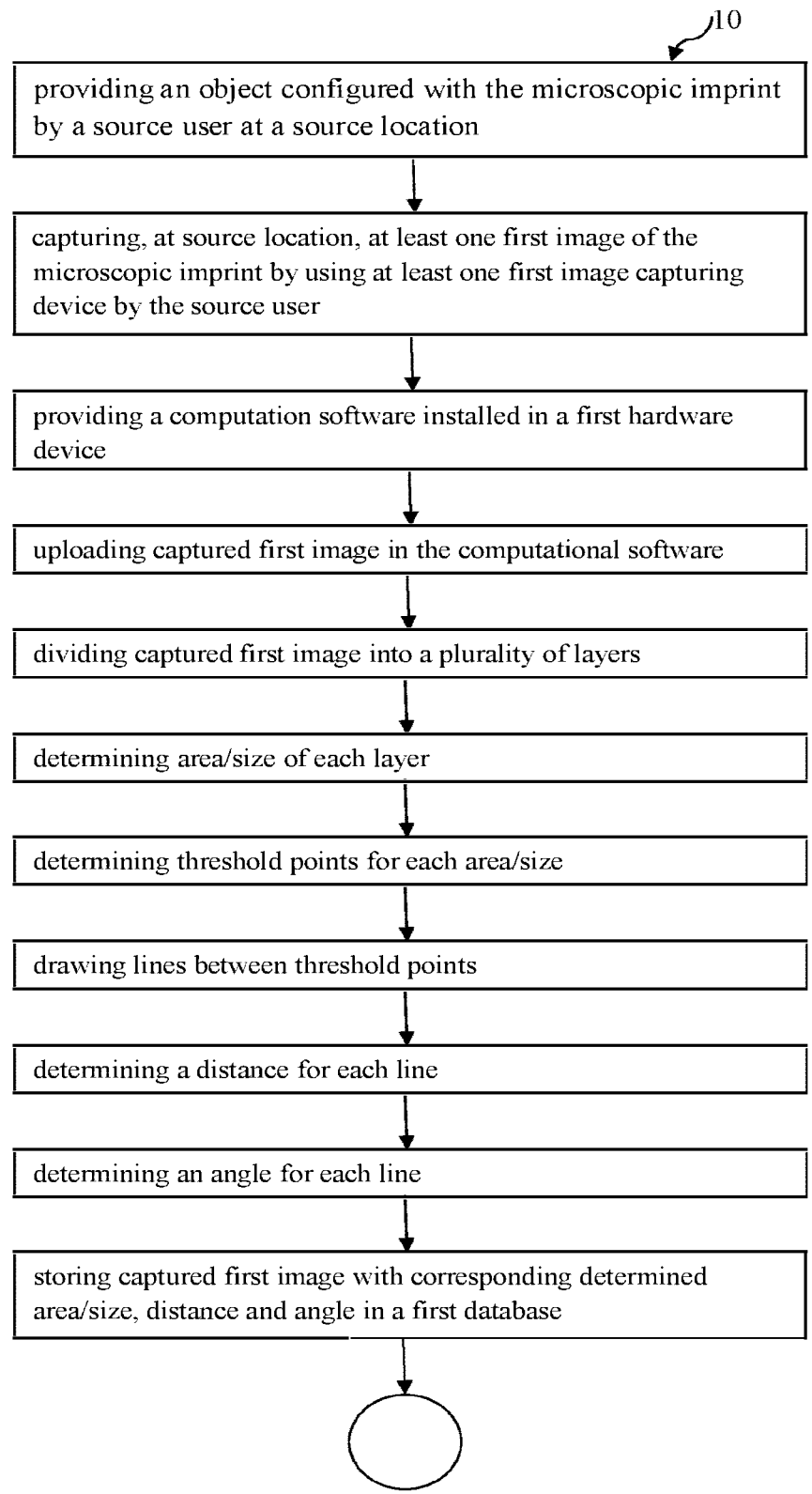
FIG. 1, FIG. 1A, and FIG. 1B represent a flowchart 10 of a method for analyzing and verifying a microscopic imprint configured on a surface of an object.
Figure 1A:
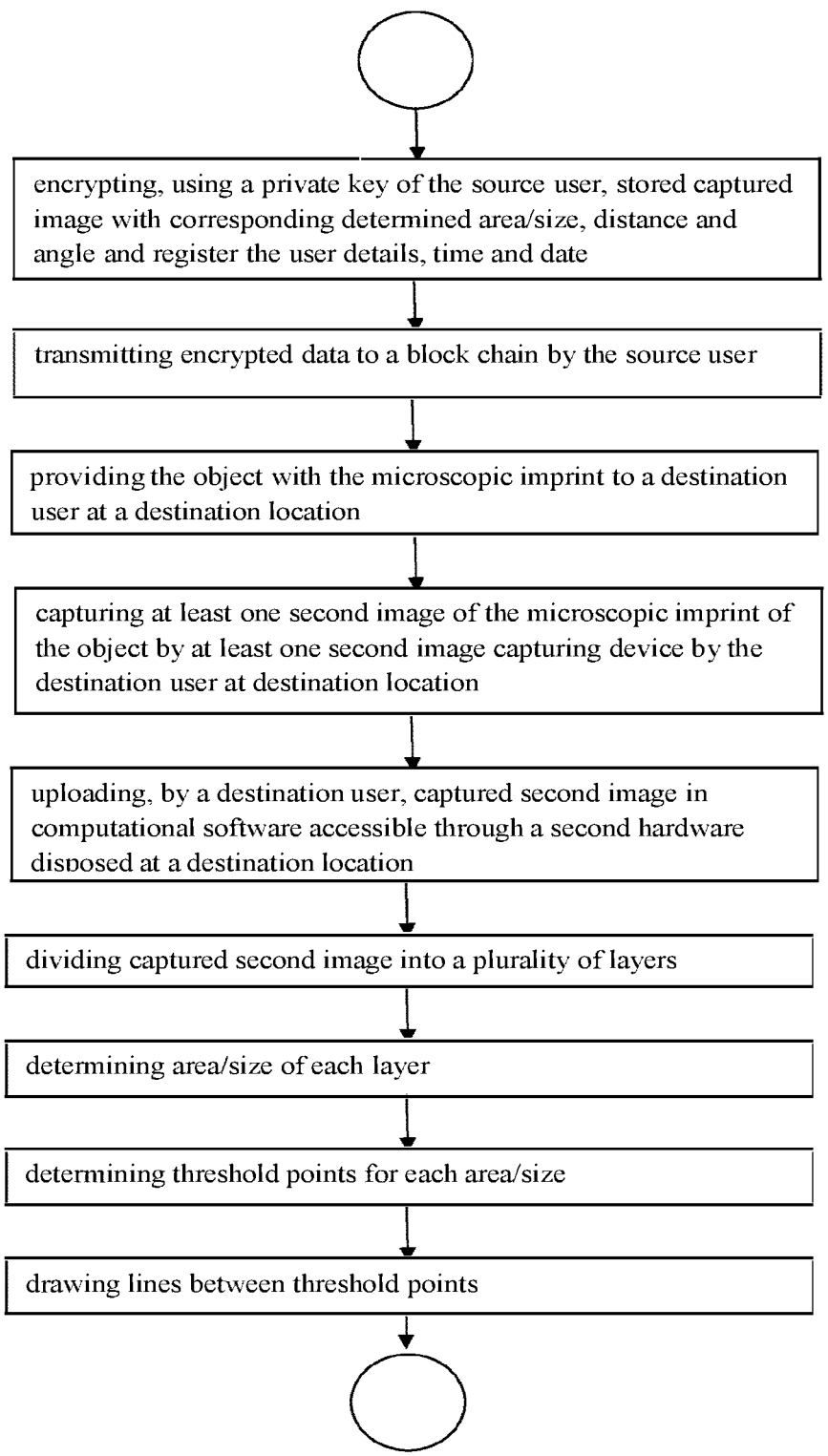
Figure 1B:
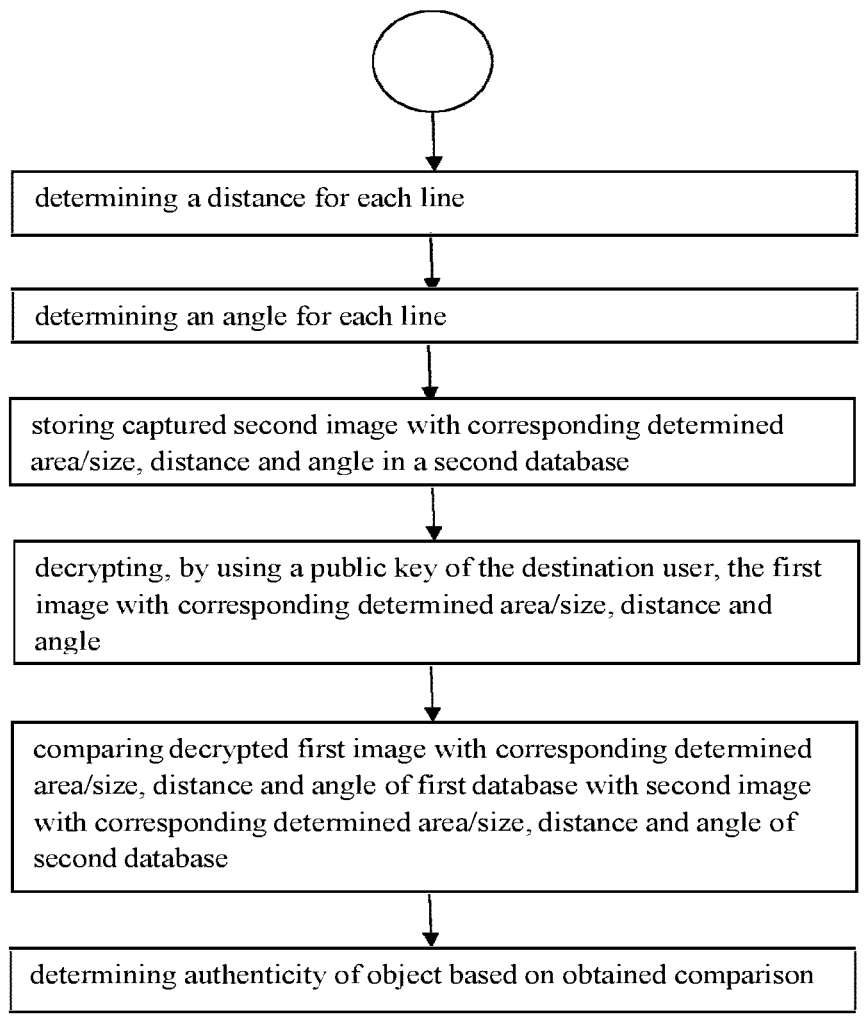

Referring now to the drawings, FIG. 1, FIG. 1A and FIG. 1B, where the present invention is generally referred to with numeral 10, it can be observed that a method for analyzing and verifying a microscopic imprint configured on a surface of an object, in accordance with one embodiment, is provided that mainly includes the following steps.

At a source location, a source user is provided with an object that is configured with the microscopic imprint. The source user can be a manufacturer, a banker, an assayer, jewelers or similar other personals handling high-value objects. Microscopic imprint is configured on the object by a microscopic imprint device.

The method can include three cameras such a varifocal camera, a standard camera and a microscopic camera. The standard camera captures an image of the object to determine the position and size of the object and the pocket(s) having the imprints therein. The width, height and length of the object is measured using a laser measuring device. The varifocal camera focuses on the pocket(s) to determine the size and position of the imprints in the pocket(s).

To create the fingerprint of the imprint within the pocket(s) a software will analyze the images taken using the varifocal camera, a standard camera and a laser measuring device. The software will measure the contours of the individual markings within the pocket(s) along with the area of each marking. The software then categorizes the markings by size. Markings of the same category are connected to each other using lines. This is so that the fingerprint can be identified even if the image is rotated. The categories based on size are defined by the areas of each marking, this may include depth of the markings, measured by dividing the pocket(s) by layers. The microscopic camera is then used to identify the characteristics of the metal and the markings, such as streaks in the metal or striations or veins. The angles between the veins are measured using the microscopic camera. This adds another component to the fingerprint of the pocket(s).

Ultimately, a metal having two pockets can have eight components to its fingerprint. The first three components are the configuration of lines matching small, medium and large markings in a first pocket. The fourth through sixth components are the same configuration of lines in a second pocket. The seventh and eight components are the microscopic images of each pocket with the angles between veins in the metal. The system then generates one vector per component. For example, for the component made up of the lines between small markings, the vector will include the length of the lines and the angles between them. For the veins of the object, that can be metal or plastic or similar material capable of being marked, the shape of the veins or other object characteristics are included in the vector along with the length of the veins, their thickness and angles between them.

The vectors and images for the object along with its dimensions and number of pockets is recorded in a database. The information is encrypted with a public and private key and timestamped by a public server and can be uploaded to a blockchain. The information stored in the blockchain makes it possible to identify who added the fingerprint information, when that fingerprint information was generated and from where that fingerprint information was uploaded. The use of public and private keys assures the integrity of the information along with the information held in the blockchain being immutable. Thereby making this process a perfect record keeper to avoid counterfeits. If an object such as a gold bullion is desired to be verified for authenticity, its markings can be compared to the vectors stored in the blockchain and the public key infrastructure certifies the origin of the information.

In one embodiment, at source location and by source user, an image of the general object is produced. In another embodiment, at source location and by source user, using a laser meter, the dimensions of the object are calculated such as height, width and length. In another embodiment, at source location and by source user, the imprint location is identified. In another embodiment, at the source location and by source user, at least one first image of microscopic imprint is captured by using at least one first image capturing device. In another embodiment, at source location and by source user, at least one first image of microscopic imprint and at least a portion of object are captured by using at least one first image capturing device. Thus, along with capturing microscopic imprint, the portion of object is also captured so that veins of material can be used as a second level for analyses and verifying. Typically, the first image capturing device is a camera. Multiple cameras can be used to capture a three-dimensional image of object.

The next step is providing a computation software which is installed in a first hardware device located at the source location and operable by a source user. The captured image is then uploaded in the computation software.

In the computation software, an uploaded image is analyzed for identification of distinguished features. Using the size and area of the features detected, the image is divided into a plurality of layers. In one embodiment, the uploaded image is divided into three layers, namely a first small layer, a second medium layer and a third large layer.

Once the uploaded image is divided, according to their size, into the required number of layers, area and/or size of each layer is/are determined. According to the maximum size of the layers, the threshold points are calculated for each area/size. Lines are drawn between threshold points.

Distance is determined for each line. In one embodiment, all angles are determined for each and every line. The result of this process is an image for every layer, with a point in each detected feature, with lines between each point. A vector for each layer is produced. The nature of these calculations avoids using any other reference other than the features, therefore the produced results do not depend on the imprint alignment or position.

Storing the calculated vector of the first image with the corresponding original image and the measured dimensions occurs in a database. Then after, a source user encrypts the data using a private key, storing the captured image with the corresponding vector and the dimensions information. The encrypted data is timestamped by a public timeserver. Encrypted data is transmitted to a blockchain by a source user so that the data is secured and not manipulated.

The object is then provided to a destination user disposed at a destination location that could be an end user, a distributor, other intermediaries or could be source user itself who have received rejected object claiming to be duplicate.

At the destination location, a slightly different process takes place. The destination user uses a public key to access the database containing information regarding an object and the original unique markings made. There exists a similar timestamp as previously mentioned to take note of exactly what user accessed the database at what time. The major difference between the accessing of the database by source user and the destination user is that the destination user uses the database to search for information. Unlike the source user, whom uploads new information to the database. The destination user captures at least one second image of the microscopic imprint of the object with at least one image capturing device. This image is used to compare to what is found already in the database.

The new vector calculated is compared to those stored in the database. Once the vector is identified, the stored data of the vector is retrieved. Using the source user's public key, the retrieved data is decrypted, therefore the identity of the source user and the authenticity of the object are verified.

Based on obtained comparison, the authenticity of object is determined.

Thus, the authenticity of precious objects having a microscopic image is easy and any duplication of objects is easily determined. Further, along with an examination and analysis of the microscopic image, a second layer of examination and analysis is possible by examining veins on the material. This second layer of examination and analysis helps to rule out fakes. The accuracy of the examination, analysis and verification is comparatively more because each captured image is divided into multiple layers.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A method for analyzing and verifying a microscopic imprint, said method comprising:
providing an object configured with the microscopic imprint by a source user at a source location;
determining size of the object;

capturing, at the source location, at least one first image of the microscopic imprint by using at least one first image capturing device by said source user;
providing a computation software installed in a first hardware device;
uploading captured first image in said computational software;
dividing captured first image into a plurality of layers;
determining unique features of each layer;
determining threshold points for each layer;
drawing lines between threshold points;
determining a distance for each line;
determining angles for each line;
storing captured first image with corresponding vector in a database;
encrypting, using a private key of said source user, stored captured image with corresponding determined area/size, distance and angle and register the user details, time and date;
transmitting encrypted data to a blockchain by said source user;
providing the object with the microscopic imprint to a destination user at a destination location;
capturing at least one second image of the microscopic imprint of the object by at least one second image capturing device by said destination user at destination location;
uploading, by a destination user, captured second image in computational software accessible through a second hardware disposed at a destination location;
dividing captured second image into a plurality of layers;
determining area/size of each layer;
determining threshold points for each area/size;
drawing lines between threshold points;
determining a distance for each line;
determining an angle for each line;
storing captured second image with corresponding determined area/size, distance and angle in a second database;
decrypting, by using a public key of the destination user, said first image with corresponding determined area/size, distance and angle;
comparing decrypted first image with corresponding determined area/size, distance and angle of first database with second image with corresponding determined area/size, distance and angle of second database; and
determining the authenticity of object based on the obtained comparison.

2. The method as claimed in claim 1, wherein the step of capturing at least one image of the microscopic imprint includes capturing at least a portion of the object for capturing veins of the material, said capture image of material is analyzed and verified.

3. The method as claimed in claim 1, wherein the step of dividing captured second image into a plurality of layers includes dividing into a first small layer, a second medium layer and a third large layer.

4. The method as claimed in claim 1, wherein the step of capturing includes capturing a three-dimensional image of the first and second microscopic imprints.

5. The method as claimed in claim 1, wherein the step of determining size/area, distance and angle includes determining by user of a laser meter.

6. A method for analyzing and verifying a microscopic imprint, said method comprising:
providing an object configured with the microscopic imprint by a source user at a source location;
capturing, at source location, at least one first three-dimensional image of the microscopic imprint and at least a portion of the object for capturing veins of the material by using at least one first image capturing device by said source user;
providing a computation software installed in a first hardware device;
uploading captured first image of imprint and portion of object in said computational software;
dividing captured first image into a plurality of layers;
determining area/size of each layer;
determining threshold points for each area/size;
drawing lines between threshold points;
determining a distance for each line by a laser meter;
determining an angle for each line;
storing captured first image with corresponding determined area/size, distance, angle and veins of material in a first database;
encrypting, using a private key of said source user, stored captured image with corresponding determined area/size, distance, angle and veins of material and register the user details, time and date;
transmitting encrypted data to a blockchain by said source user;
providing the object with the microscopic imprint to a destination user at a destination location;
capturing at least one second three-dimensional image of the microscopic imprint and portion of the object by at least one second image capturing device by said destination user at destination location;
uploading, by a destination user, captured second image in computational software accessible through a second hardware disposed at a destination location;
dividing captured second image into a first small layer, a second medium layer and a third large layer;
determining area/size of each layer;
determining threshold points for each area/size;
drawing lines between threshold points;
determining a distance for each line by a laser meter;
determining an angle for each line;
examining veins of material;
storing captured second image with corresponding determined area/size, distance, angle and veins of material of object in a second database;
decrypting, by using a public key, said first image with corresponding determined area/size, distance and angle;
comparing decrypted first image with corresponding determined area/size, distance, angle and examined veins of material of object of first database with second image with corresponding determined area/size, distance, angle and examined veins of material of object of second database; and
determining authenticity of object based on obtained comparison.

* * * * *